United States Patent [19]

Nagao et al.

[11] Patent Number: 5,714,022
[45] Date of Patent: Feb. 3, 1998

[54] PNEUMATIC TIRE WITH TWO-LAYER SIDEWALLS

[75] Inventors: Takashi Nagao; Takuji Yamamoto, both of Hyogo; Takayuki Uchio, Osaka, all of Japan

[73] Assignee: Toyo Tire & Rubber Co., Ltd., Osaka, Japan

[21] Appl. No.: 708,367

[22] Filed: Sep. 4, 1996

Related U.S. Application Data

[63] Continuation of Ser. No. 434,304, May 2, 1995, abandoned, which is a continuation of Ser. No. 206,912, Mar. 7, 1994, abandoned, which is a continuation of Ser. No. 989,743, Dec. 10, 1992, abandoned, which is a continuation of Ser. No. 343,972, Apr. 26, 1989, abandoned.

[30] Foreign Application Priority Data

May 2, 1988 [JP] Japan .................... 63-109553
May 26, 1988 [JP] Japan .................... 63-128984

[51] Int. Cl.⁶ .................... B60C 1/00; B60C 13/00
[52] U.S. Cl. .................... 152/525; 152/532
[58] Field of Search .................... 152/450, 510, 152/524–525, 555, DIG. 12, 532; 525/211, 237

[56] References Cited

U.S. PATENT DOCUMENTS

| | | | |
|---|---|---|---|
| 2,631,984 | 3/1953 | Crawford et al. | 152/DIG. 12 X |
| 3,630,974 | 12/1971 | Ladosci et al. | 525/237 X |
| 3,653,423 | 4/1972 | Paddock | 152/525 X |
| 3,830,274 | 8/1974 | Waser, Jr. | 152/525 X |
| 3,937,862 | 2/1976 | Pillenschneider | 152/525 X |
| 4,224,196 | 9/1980 | Gursky | |
| 4,240,487 | 12/1980 | Lal et al. | 152/525 |
| 4,714,734 | 12/1987 | Hashimoto et al. | 524/496 |
| 5,088,537 | 2/1992 | Kan et al. | 152/555 X |

FOREIGN PATENT DOCUMENTS

| | | |
|---|---|---|
| 59-14502 | 1/1984 | Japan . |
| 62-143955 | 6/1987 | Japan . |
| 975106 | 11/1964 | United Kingdom .................... 152/525 |

*Primary Examiner*—Adrienne C. Johnstone
*Attorney, Agent, or Firm*—Jordan and Hamburg

[57] ABSTRACT

The invention provides a pneumatic tire in which each sidewall covering and protecting the side face of the carcass has a double-layer structure consisting of an inner layer adjacent to the carcass and an outer layer disposed outwardly on the inner layer and which is characterized in that the rubber component of the rubber composition constituting the inner layer consists essentially of 10 to 30% by weight of at least one rubber having a low degree of unsaturation selected from the group consisting of halogenated butyl rubber and ethylene-propylene-diene rubber and 90 to 70% by weight of at least one rubber having a high degree of unsaturation selected from the group consisting of natural rubber, isoprene rubber, butadiene rubber and styrene-butadiene rubber and that the rubber component of the rubber composition constituting the outer layer consists essentially of 30 to 60% by weight of at least one rubber having a low degree of unsaturation selected from the corresponding group defined above and 70 to 40% by weight of at least one rubber having a high degree of unsaturation selected from the corresponding group defined above.

1 Claim, 2 Drawing Sheets

PNEUMATIC TIRE WITH TWO-LAYER SIDEWALLS

This application is a continuation, of application Ser. No. 08/434,304 filed May 2, 1995, now abandoned, which is a continuation of application Ser. No. 08/206,912 filed Mar. 7, 1994, now abandoned, which is a continuation of application Ser. No. 07/989,743 filed Dec. 10, 1992, now abandoned, which is a continuation of application Ser. No. 07/343,972 filed Apr. 26, 1989, now abandoned.

BACKGROUND OF THE INVENTION

This invention relates to a pneumatic tire and, more particularly, to a pneumatic tire in which the sidewall covering and protecting each side face of the carcass is composed of an inner layer and an outer layer differing in rubber composition.

Prior art pneumatic tires generally have sidewalls made of a rubber composition comprising a rubber having a high degree of unsaturation, the main chain of which has a high double bond content, such as natural rubber, isoprene rubber (IR), butadiene rubber (BR) or styrene-butadiene rubber (SBR). Since the double bonds in the main chain of the molecule of such rubber are apt to react with ozone, leading to depolymerization, when the tire is exposed to intense ultraviolet rays or to a high concentration of ozone in air, cracking thereof, namely the so-called ozone cracking, occurs. For preventing such cracking, an antiozonant, for example an amine type antioxidant or a wax, is generally incorporated in the rubber composition constituting the sidewalls.

However, pneumatic tires the sidewalls of which are made of a rubber composition containing such an antiozonant are subject to blooming of the antiozonant on the sidewall surface during storage. Such blooming makes them look as if they are covered with dust. Furthermore, amine type antioxidants readily turn brown upon exposure to air and/or sunlight, so that the thin antiozonant layer formed on the sidewall surface as a result of blooming becomes brown. This masks the original black color of the tires and spoils their appearance, reducing their commercial value.

Therefore, investigations were made to construct the sidewalls with a rubber composition containing an antiozonant, which may possibly cause blooming and staining of the sidewalls, in a reduced amount by using a rubber having a low unsaturated bond content, or low degree of unsaturation, and thus having stronger ozone resistance by itself (e.g. U.S. Pat. No. 4,224,196; Japanese Kokai Patent Publication No. 59-14502; Japanese Kokai Patent Publication No. 62-143955).

However, rubbers having a low degree of unsaturation are curable at a slower rate as compared with diene rubbers (rubbers having a high degree of unsaturation) generally used in carcass and tread formation. Therefore, even when the rate of curing of the former is adjusted so as to become comparable to the rate of curing of the latter by using a vulcanization accelerator, migration of the accelerator occurs at the interface between the former and the latter, so that the rate of curing becomes faster locally and the period over which both the rubber species can diffuse through each other becomes shortened. As a result, the adhesion between them becomes poor. Such problem cannot be solved even by the means proposed in Japanese Kokai Patent Publication No. 59-14502, which comprises constructing the sidewalls each as a double-layer structure having an inner layer and an outer layer using a rubber composition containing a large amount of a rubber having a low degree of unsaturation for the construction of the outer layer and a diene rubber for the construction if the inner layer. Pneumatic tires in which a rubber having a low degree of unsaturation is used for the formation of the sidewall thus have never been put to practical use.

SUMMARY OF THE INVENTION

Accordingly, it is an object of the invention to solve the above problem and provide a pneumatic tire having sidewalls showing good adhesion to the carcass and other portions constructed with a diene rubber composition while using rubbers having a low degree of unsaturation.

The pneumatic tire according to the invention is a pneumatic tire in which each sidewall covering and protecting the side face of the carcass has a double-layer structure consisting of an inner layer adjacent to the carcass and an outer layer disposed outwardly on said inner layer and which is characterized in that the rubber component of the rubber composition constituting said inner layer consists essentially of 10 to 30% by weight of at least one rubber having a low degree of unsaturation selected from the group consisting of halogenated butyl rubber and ethylene-propylene-diene (EPDM) rubber and 90 to 70% by weight of at least one rubber having a high degree of unsaturation selected from the group consisting of natural rubber, isoprene rubber, butadiene rubber and styrene-butadiene rubber and that the rubber component of the rubber composition constituting said outer layer consists essentially of 30 to 60% by weight of at least one rubber having a low degree of unsaturation selected from the corresponding group defined above and 70 to 40% by weight of at least one rubber having a high degree of unsaturation selected from the corresponding group defined above.

The rubber component of the rubber composition constituting the outer layer contains 30 to 60% by weight of a rubber or rubbers having a low degree of unsaturation, so that the outer layer has good ozone resistance. The rubber component of the rubber composition constituting the inner layer contains 10 to 30% by weight of a rubber or rubbers having a low degree of unsaturation, so that the inner layer is never inferior in adhesion to the outer layer. When the content of the rubber having a low degree of unsaturation amounts to 15 to 30% by weight, the inner layer can have improved resistance to ozone cracking. Since the rubber component of the rubber composition constituting the inner layer contains 90 to 70% by weight of a rubber having a high degree of unsaturation, said inner layer is never poor in adhesion to the carcass and other portions made of a composition containing a rubber having a high degree of unsaturation. The inner layer is thus composed of a rubber composition having an intermediate composition between the outer layer and carcass, so that it serves as a buffer layer for preventing a radical change in rubber composition and can undergo satisfactory simultaneous curing with the outer layer and carcass to give good adhesion thereto.

When the content of the rubber having a high degree of unsaturation in the rubber component of the outer layer-constituting rubber composition exceeds 70% by weight, the resistance to ozone cracking decreases remarkably. On the other hand, when the content of the rubber having a high degree of unsaturation in said component is below 40% by weight, the difference in rate of curing between the outer layer and the rubber layer mainly composed of a rubber having a high degree of unsaturation becomes too great, causing markedly decreased adhesion and, at the same time, decreased resistance to bending fatigue.

When the content of the rubber having a high degree of unsaturation in the rubber component of the rubber composition constituting the inner layer is less than 70% by weight, the adhesion to the rubber layer of the carcass, among others, which is mainly made of a rubber having a high degree of unsaturation becomes insufficient for the same reason as mentioned above.

As mentioned above, the pneumatic tire according to the invention retains the durability and ozone resistance and at the same time is prevented from the impairment of its appearance on the sides due to staining.

Furthermore, the present invention provides a pneumatic tire having sidewalls with good adhesion to the carcass and other portions constructed with a diene rubber composition in spite of the use of a rubber having a low degree of unsaturation.

DETAILED DESCRIPTION OF PREFERRED EMBODIMENTS

Figure 1:
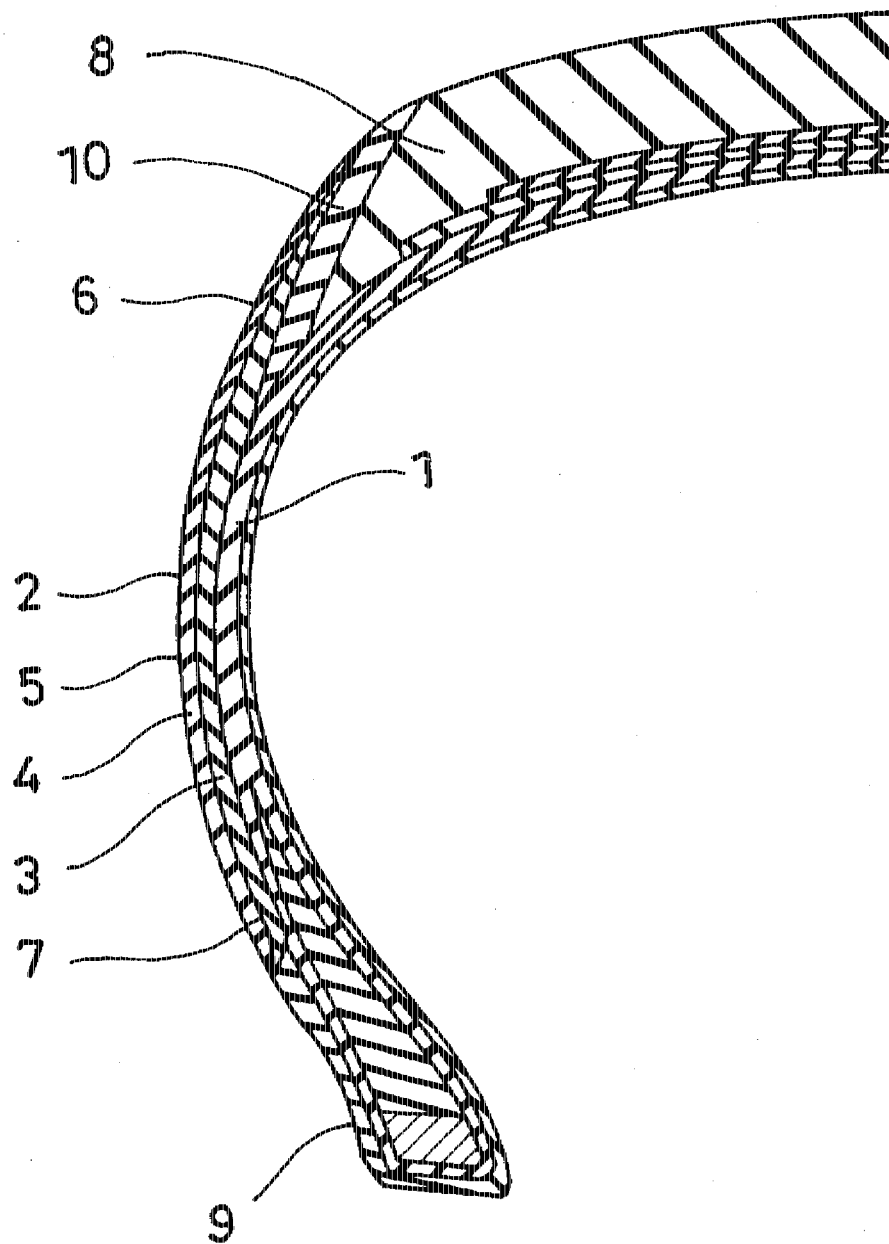
FIG. 1 shows an embodiment of the invention in a meridian section of the half thereof and FIG. 2 shows another embodiment of the invention in a meridian section of the half thereof.

The halogenated butyl rubber, which is one of the rubbers having a low degree of unsaturation to be used in accordance with the invention, includes, among others, brominated butyl rubber and chlorinated butyl rubber. Brominated butyl rubber is superior in adhesion to rubbers having a high degree of unsaturation and in ozone resistance to chlorinated butyl rubber, so that it can be incorporated in large amounts in rubber compositions without causing decreases in adhesion to rubbers having a high degree of unsaturation and, as a result, can give rubber compositions showing good ozone resistance. On the other hand, when both the halogenated rubber species are incorporated in amounts to give the same level of ozone resistance, rubber compositions containing brominated butyl rubber show better adhesion to rubbers having a high degree of unsaturation. Therefore, for both the inner layer and outer layer rubber compositions, brominated butyl rubber is preferred to chlorinated butyl rubber from the practical viewpoint.

On the other hand, EPDM, which is a rubber having a low degree of unsaturation, is poor in adhesion to rubbers having a high degree of unsaturation although it is superior in ozone resistance to halogenated butyl rubbers. Therefore, EPDM should preferably be used in combination with brominated butyl rubber. In that case, brominated butyl rubber should preferably be used in major proportion from the viewpoint of adhesion to rubbers having a high degree of unsaturation.

When brominated butyl rubber is incorporated in the rubber component of the rubber composition constituting the outer layer in amounts exceeding 60% by weight, the tensile strength, processability or workability and/or dimensional stability may possibly be reduced in certain instances. Therefore, when the outer layer should be thin for reasons of tire designing, it is preferable, for attaining a high level of ozone resistance, to use EPDM combinedly in an amount of 10 to 30% by weight so that the total content of brominated butyl rubber and EPDM amounts 40 to 60% by weight. When the content of brominated butyl rubber in the outer layer is below 20% by weight, the adhesion to rubbers having a high degree of unsaturation and the resistance to flexural fatigue become insufficient. When, on the other hand, the content of EPDM exceeds 30% by weight, the adhesion to rubber layers mainly made of a rubber having a high degree of unsaturation decreases and the resistance to flexural fatigue may also decrease more remarkably. When the content of EPDM is less than 10% by weight, the ozone resistance may be poor in some instances.

Incorporation of brominated butyl rubber in the rubber component of the rubber composition constituting the inner layer in amounts exceeding 30% by weight may cause decreases in adhesion to rubber layers mainly made of a rubber having a high degree of unsaturation. The proportion of EPDM in the rubber component for the inner layer should preferably be not more than 20% by weight from the viewpoint of adhesion to rubber layers mainly made of a rubber having a high degree of unsaturation and/or from the viewpoint Of resistance to flexural fatigue.

For the so-called SWOT structure in which the inside face of the upper end portion of each sidewall is in close connection with each side face of the tread rubber, it is preferable that the upper end portion of the sidewall should also have a double-layer structure since in that case, the tread made of a rubber having a high degree of unsaturation comes adjacent to the inner layer containing a major proportion of a rubber having a high degree of unsaturation.

On the other hand, for the so-called TOS structure in which each peripheral inside face of the tread rubber is adhered to the outside face of the upper end portion of each sidewall, it is advisable that the upper end portion of each sidewall, which is to be adhered to the inside face of the tread, should have no outer layer portion and the inner layer should be adhered directly to the tread.

The invention is now described in further detail with reference to some examples of the rubber compositions suited for use in the practice of the invention.

Rubber compositions containing at least one rubber having a low degree of unsaturation in lieu of a part of a rubber or rubbers having a high degree of unsaturation were prepared according to the formulations (in parts by weight) shown below in Table 1 for the purpose of confirming the improvement in ozone resistance of and the good adhesion between said rubber compositions. The results of the ozone resistance and staining tests are shown in Table 1. The rubber composition combinations shown in Table 2 were tested for adhesive strength and the results obtained are shown in Table 2.

The physical characteristics mentioned above were evaluated as follows:

a. Ozone cracking test (for evaluating dynamic ozone resistance and staining)

Test specimens, 10 mm in width, 2 mm in thickness and 40 mm in mark-to-mark distance, were prepared from each rubber composition. The specimens were subjected to accelerated aging at 90° C. for 48 hours and then subjected to repeated stretching at a percent stretch [$\Delta l/l$)×100] of 25% at a frequency of 60 times per minute in an atmosphere containing 50 pphm of ozone and maintained at 40° C., and the time required for 50% of the test specimens to have been broken was determined.

The test specimens were continuedly maintained in the ozone atmosphere under the same test conditions even after breakage thereof and, after 24 hours of ozone exposure, they were evaluated for staining. The criteria for staining evaluation were as follows: distinct staining—remarkable; slight staining—slight intermediate between the former two—moderate; no change in color—no change.

b. Adhesion test (for evaluating rubber-to-rubber adhesion)

An organic textile-backed rubber sheet was laid on top of another so that rubber-rubber peeling could be realized. The assembly was cured at 160° C. for 20 minutes and cut to strips having a width of 2.5 cm, and the strips were tested for rubber-to-rubber adhesive strength.

In Table 1 and Table 2, the rubber composition A is a typical example of the rubber composition for constructing the prior art single-layer sidewalls.

The rubber composition K shown in Table 2 is a typical example of the carcass-constituting rubber composition and has the following compositions:

|  | (Parts by weight) |
| --- | --- |
| Natural rubber | 85 |
| Butadiene rubber | 15 |
| Zinc white | 5 |
| Stearic acid | 1 |
| Antioxidant*1 | 2 |
| Tackifier | 1 |
| Carbon black (FEF) | 40 |
| Naphthenic oil | 8 |
| Accelerator MSA*2 | 1 |
| Sulfur | 2 |

*1: N-(1,3-Dimethylbutyl)-N'-phenyl-p-phenylenediamine
*2: N-Oxydiethylene-2-benzothiazolesulfenamide

TABLE 1

| Rubber composition | A | B | C | D | E | F | G | H | I | J |
| --- | --- | --- | --- | --- | --- | --- | --- | --- | --- | --- |
| Natural rubber | 85 | 30 | 25 | 50 | 50 | 50 | 30 | 30 | 40 | 25 |
| Butadiene rubber | 15 | 60 | 60 | 20 | — | 20 | 25 | — | — | — |
| Styrene-butadiene rubber | — | — | — | — | 20 | — | — | 20 | — | — |
| Brominated butyl rubber | — | 10 | 15 | 20 | 20 | — | 30 | — | 45 | 50 |
| Chlorinated butyl rubber | — | — | — | — | — | 20 | — | — | — | — |
| EPDM | — | — | — | 10 | 10 | 10 | 15 | 50 | 15 | 25 |
| Zinc white | 5 | 3 | 3 | 3 | 3 | 3 | 3 | 5 | 5 | 5 |
| Stearic acid | 2 | 2 | 2 | 2 | 2 | 2 | 2 | 2 | 2 | 2 |
| Antioxidant*1 | 5 | 2.5 | 2.5 | 1 | 1 | 1 | 1 | — | — | — |
| Wax | 2 | 2 | 2 | 2 | 2 | 2 | 1 | — | — | — |
| Carbon black | 50 | 50 | 50 | 50 | 50 | 50 | 50 | 50 | 50 | 50 |
| Aromatic oil | 10 | 10 | 10 | 10 | 10 | 10 | 10 | 10 | 10 | 10 |
| Accelerator DM*2 | — | — | — | — | — | — | 0.9 | 1.1 | 0.9 | 1.2 |
| Accelerator CZ*3 | 0.8 | 0.8 | 0.8 | 1 | 1 | 1 | — | — | — | — |
| Vultac*4 | — | — | — | — | — | — | 1.1 | — | 1.1 | 1.1 |
| Sulfur | 2 | 1.8 | 1.8 | 1.8 | 1.8 | 1.8 | 0.6 | 1.5 | 0.6 | 0.6 |
| Ozone resistance (hours) | 12 | 12 | 12 | 16 | 16 | 15 | 24 | 32 | 24 | 26 |
| Staining | Remarkable | Moderate | Moderate | Slight | Slight | Slight | No change | No change | No change | No change |

*1 Antioxidant: N-(1,3-Dimethylbutyl)-N'-phenyl-p-phenylenediamine
*2 Accelerator DM: Dibenzothiazyl disulfide
*3 Accelerator CZ: N-Cyclohexyl-2-benzothiazylsulfenamide
*4 Vultac: Alkylphenol disulfide (Pennsalt Chem.)

TABLE 2

| Rubber composition | (kg/cm width) | | | | | | | |
| --- | --- | --- | --- | --- | --- | --- | --- | --- |
| Rubber composition | A | B | C | D | E | F | G | H |
| A | ST | — | — | — | — | — | — | — |
| B | ST | ST | — | — | — | — | — | — |
| C | ST | ST | ST | — | — | — | — | — |
| D | 12 | 12 | 16 | ST | — | — | — | — |
| E | 10 | 10 | 12 | 14 | 16 | — | — | — |
| F | 10 | 10 | 8 | 12 | 16 | 14 | — | — |
| G | 8 | 12 | 14 | 17 | 16 | 14 | 18 | — |
| H | 4 | 4 | 4 | 4 | 6 | 4 | 4 | 8 |
| I | 6 | 10 | 10 | 14 | 6 | 11 | 16 | 6 |
| J | 2 | 2 | 4 | 8 | 8 | 6 | 10 | 4 |
| K | ST | ST | ST | 12 | 10 | — | — | — |

ST: Specimens were torn and measurement failed.

As can be seen from the data shown in Table 1, the rubber compositions D to J in which the content of a rubber or rubbers having a low degree of unsaturation in the rubber component is not less than 30% by weight are superior in ozone resistance to the conventional rubber composition A exclusively composed of rubbers having a high degree of unsaturation. Furthermore, the compositions D to J show only slight staining or no staining.

However, as indicated by the data in Table 2, the rubber compositions G to J are relatively less adhesive to the rubber compositions A and K. Even when layers made of such rubber compositions G to J are caused to adhere to layers made of the rubber composition A or K, the possibility of separation during use is thus high.

When, however, the rubber compositions of the two layers to be adhered each contains an adequate amount of at least one rubber having a low degree of unsaturation, the adhesive strength between said layers becomes high. Therefore, the rubber compositions for respectively constituting the outer layer and inner layer adjacent to each other should preferably be selected so that the difference in the content of the rubber or rubbers having a high degree of unsaturation between the rubber components for the outer layer and inner layer adjacent to each other and between the rubber components for the inner layer and the carcass can be not greater than a certain level, while using a rubber composition containing not less than 30% by weight of at least one rubber having a low degree of unsaturation for the outer layer constituting the outside face of each sidewall to thereby increase the ozone resistance. In particular, when brominated butyl rubber is used as the rubber having a low degree of unsaturation, the rubber compositions for constructing the outer and inner layers should preferably be selected so that said difference in the content of a rubber or rubbers having a high degree of unsaturation in the rubber components for the neighboring layers can be not more than 35% by weight.

In view of the foregoing, the following combinations may be mentioned as particularly preferred examples of the inner layer-outer layer rubber composition combination for constructing two-layer sidewalls using the rubber compositions shown in Table 1:

| (1) | B-G |
| (2) | C-G |
| (3) | D-G |
| (4) | D-I |
| (5) | E-G |

Now, referring to the drawings, some examples of the pneumatic tire according to the invention are described.

FIG. 1 schematically shows the structure of the so-called SWOT type tire. In the figure, the carcass (1) has a radial structure. A sidewall (2) is disposed on each side of carcass (1) in close connection therewith. The main portion (5) of sidewall (2) has a uniform thickness except for the letters and/or marks in relief. Said sidewall (2) has a double-layer structure consisting of an inner layer (3) and an outer layer (4). The upper end portion (6) of sidewall (2) is disposed on the side of the tread rubber (8) and is gradually tapering in thickness toward the upper end. The lower end portion (7) of the sidewall is tapering in thickness toward the lower end and is followed by the rim strip (9). The inner layer of main portion (5), upper end portion (6) and lower end portion (7) consists essentially of a rubber composition containing, as the rubber component thereof, 10 to 30% by weight of at least one rubber having a low degree of unsaturation and 90 to 70% by weight of at least one rubber having a high degree of unsaturation. The outer layer of main portion (5), upper end portion (6) and lower end portion (7) consists essentially of a rubber composition containing, as the rubber component thereof, 30 to 60% by weight of at least one rubber having a low degree of unsaturation and 70 to 40% by weight of at least one rubber having a high degree of unsaturation.

Since, as mentioned above, the inner layer (3) of the sidewall is in contact with tread rubber (8), carcass (1) and rim strip (9), the content of the rubber or rubbers having a low degree of unsaturation in the rubber component for said inner layer should be not more than 30% by weight.

The tread rubber (8) is made of a rubber composition containing at least one rubber having a high degree of unsaturation as in the prior art. Since, however, it is reinforced with hard carbon black, which has good reinforcing effect, and accordingly has poor adhesiveness to the inner layer, it is preferable to dispose a tread side rubber (10), which is made of a rubber composition similar to the inner layer rubber composition and showing little tendency toward staining, on the side face of tread rubber (8) by the coextrusion technique and to thereby increase the adhesion to the sidewall.

For the purpose of demonstrating the utility of the tire according to the invention, sample tires for passenger cars were produced in which the rubber composition G defined above in Table 1 was used for constructing the outer layer (4) of sidewall (2) and the rubber composition C defined in Table 1 for constituting the inner layer (3). For comparison, control tires of the conventional construction were produced in which the rubber composition A defined in Table 1 was used to construct single-layer sidewalls.

These tires were allowed to stand under the eaves with a southern exposure in a condition protected from rainwater and exposed to sunlight for one month and to then examined for sidewall staining. The tires according to the invention did not show any blooming, staining or cracks. On the contrary, the control tires showed the occurrence of blooming on the side surface although no cracks were observed. The area of blooming had a red brown color, spoiling the appearance of the tires to a remarkable extent. After exposure to sunlight, the tires were subjected to a drum test under the endurance test conditions described in the Federal Motor Vehicle Safety Standards FMVSS 109. The tires according to the invention as well as the control tires met the relevant requirements.

Figure 2:
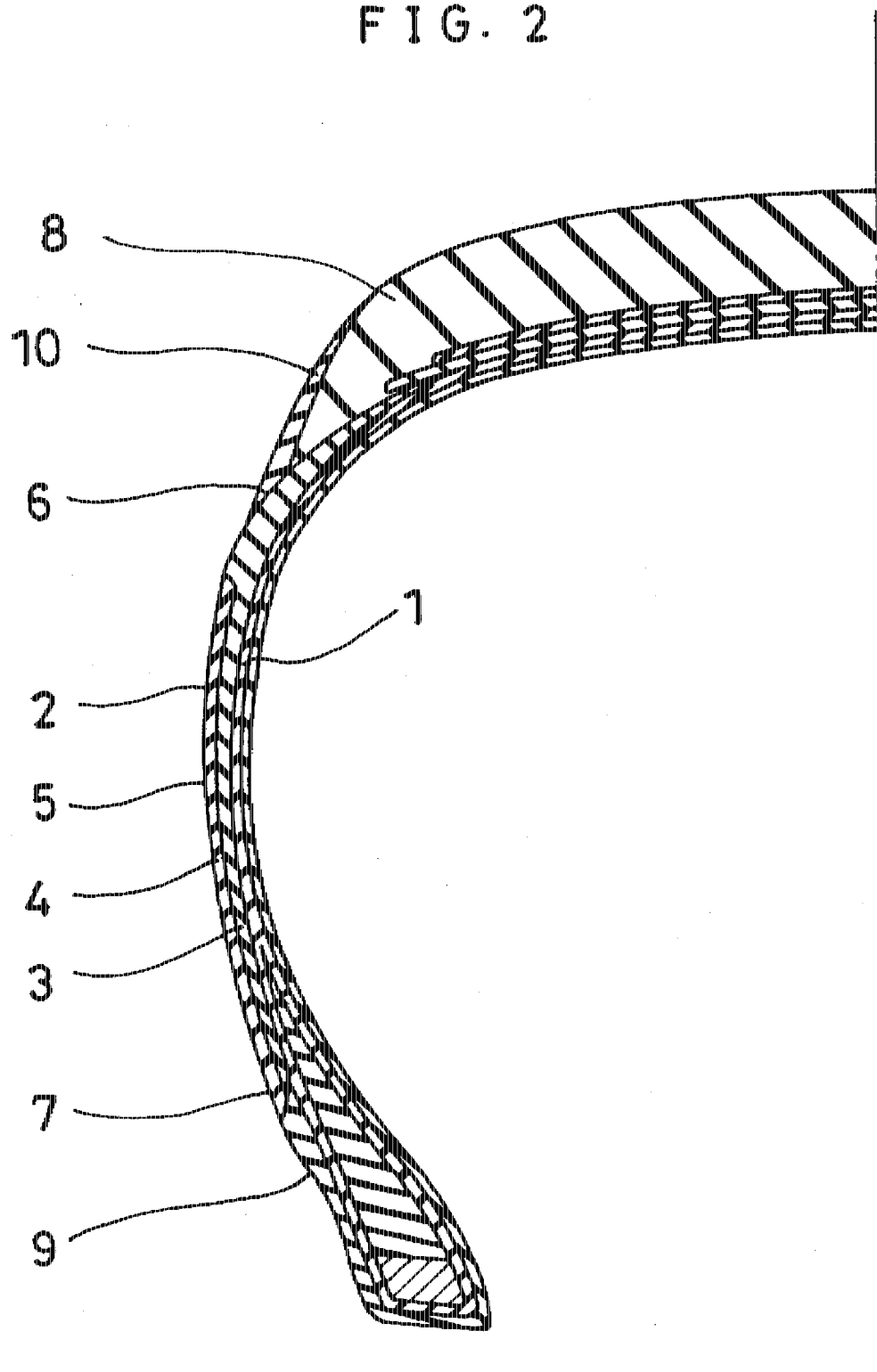

FIG. 2 shows another embodiment of the invention which has the so-called TOS structure. In this embodiment, the upper end portion (6) of sidewall (2) is made of a single layer which is an extension of the inner layer (3). Said portion (6) is tapering gradually toward the upper end and is sandwiched between the tread rubber (8) or an ozone-resistant tread side rubber (10) disposed on the outside face of said tread rubber, on one hand, and the carcass (1), on the other. The upper end portion (6), the inner layer of main portion (5) and the inner layer of lower end portion (7) are made of a rubber composition containing, as the rubber component thereof, 15 to 30% by weight of at least one rubber having a low degree of unsaturation and 85 to 70% by weight of at least one rubber having a high degree of unsaturation. The outer layer of main portion (5) and the outer layer of lower end portion (7) are made of a rubber composition containing, as the rubber component thereof, 30 to 60% by weight of at least one rubber having a low degree of unsaturation and 70 to 40% by weight of at least one rubber having a high degree of unsaturation.

Since each side of the upper end portion (6) of sidewall (2) is in contact with a rubber composition containing at least one rubber having a high degree of unsaturation (tread rubber, tread side rubber, carcass), the content of the rubber or rubbers having a low degree of unsaturation in the rubber component for said portion should be not more than 30% by weight. Furthermore, since part of said portion can be seen by the eye, the antiozonant content should be decreased from the good appearance viewpoint. Accordingly, at least one rubber having a low degree of unsaturation is used in an amount of at least 15% by weight lest the ozone resistance should be decreased.

The tread rubber (8) is made of a rubber composition containing, as the main rubber component, at least one rubber having a high degree of unsaturation as conventional in the art and the tread side rubber (10), which is made of a rubber compostion similar to the inner layer rubber composition and showing good ozone resistance and little tendency to staining, should preferably be disposed on each side of the tread rubber (8) by the coextrusion technique.

For the purpose of demonstrating the utility of the pneumatic tire according to the invention, sample tires for passenger cars were produced in which the rubber composition G defined above in Table 1 was used for constructing the outer layer (4) of sidewall (2) and the rubber composition C for constructing the inner layer (3). For comparison, control tires were produced in which the rubber compositon A defined in Table 1 was used for constituting single-layer sidewalls as is conventional in the art.

These tires were exposed to sunlight in the same manner as described hereinabove in relation to the foregoing embodiment. The results were virtually the same as those mentioned hereinabove.

What is claimed is:

1. A pneumatic tire in which each sidewall covering and protecting the side face of the carcass has a double-layer structure consisting of an inner layer adjacent to the carcass and an outer layer disposed outwardly on said inner layer, a rubber component of a rubber composition constituting said inner layer consisting essentially of 10 to 30% by weight of at least one rubber having a low degree of unsaturation selected from Group I consisting of halogenated butyl rubber and ethylene-propylene-diene rubber and 90 to 70% by weight of at least one rubber having a high degree of unsaturation selected from Group II consisting of natural rubber, isoprene rubber, butadiene rubber and styrene-butadiene rubber and a rubber component of a rubber composition constituting said outer layer consisting essentially of 30 to 60% by weight of at least one rubber having a low degree of unsaturation selected from said Group I and 70 to 40% by weight of at least one rubber having a high degree of unsaturation selected from said Group II; the rubber having a low degree of unsaturation in the rubber composition constituting said inner layer is a mixture of a major proportion of brominated butyl rubber and minor proportion of ethylene-propylene-diene rubber.

* * * * *